Figure 1:
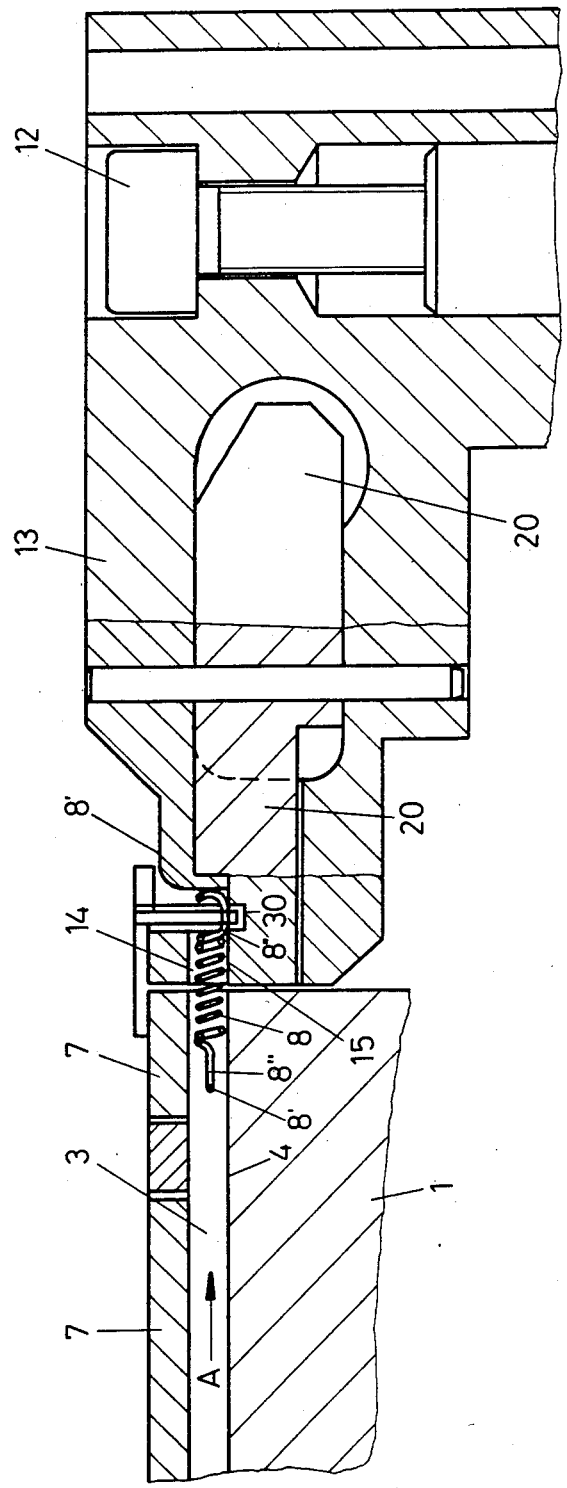

United States Patent [19]

Kumeth

[11] Patent Number: 4,667,806

[45] Date of Patent: May 26, 1987

[54] APPARATUS FOR THE SINGLING AND ORIENTATION OF TENSION COIL SPRINGS

[76] Inventor: Siegmund Kumeth, Bayreuther Strasse 37, 8450 Amberg, Fed. Rep. of Germany

[21] Appl. No.: 772,776

[22] Filed: Sep. 5, 1985

[30] Foreign Application Priority Data

Sep. 7, 1984 [DE] Fed. Rep. of Germany ....... 3432938

[51] Int. Cl.$^4$ ............................................. B65G 47/24
[52] U.S. Cl. ..................................... 198/394; 198/953
[58] Field of Search .................... 198/394, 416, 468.2, 198/388, 953; 221/210, 171; 140/3 CA, 92.8

[56] References Cited

U.S. PATENT DOCUMENTS

| | | | |
|---|---|---|---|
| 3,193,136 | 7/1965 | Stumpf et al. | 221/171 |
| 3,441,064 | 4/1969 | Fischer et al. | 140/3 CA |
| 3,752,311 | 8/1973 | Kobusch et al. | 198/388 X |
| 3,918,473 | 11/1975 | Ramsey | 140/3 CA |
| 4,269,300 | 5/1981 | Spuhl | 198/468 Z X |
| 4,281,961 | 8/1981 | Redman | 198/953 X |

FOREIGN PATENT DOCUMENTS 126514 3/1961 Fed. Rep. of Germany.
3321173 12/1984 Fed. Rep. of Germany ...... 198/953

*Primary Examiner*—Joseph E. Valenza
*Assistant Examiner*—D. Glenn Dayoan
*Attorney, Agent, or Firm*—Lucas & Just

[57] ABSTRACT

The invention relates to an apparatus for singling and orienting coiled tension springs which have hook-like bends at, at least one end of the spring. The apparatus uses a guide through which the springs are fed to a receiver. The receiver has a chamber and the chamber has an inlet opening for the introduction of the spring into the chamber of the receiver. The receiver can swing about an axis that is transverse of the axis of the guide from a first position in which the inlet opening of the chamber is in line with the guide and the chamber of the receiver forms the prolongation of the guide to a second position in which the inlet opening of the chamber is out of line with the guide. A sword-like element moves into and out of the chamber in a direction transverse to the chamber.

42 Claims, 3 Drawing Figures

APPARATUS FOR THE SINGLING AND ORIENTATION OF TENSION COIL SPRINGS

The invention relates to an apparatus for the singling and orientation of tension coil springs according to the generic concept of claim 1.

Tension coil springs are very frequently used in the manufacture of components, machines etc. in all fields of technology, and as a rule they are so configured that these tension springs will have at each end a hook-shaped bend for installing or fastening the springs, in such a manner that at each end of the tension spring the coiled part is adjoined first by a substantially straight section, which is then followed by the actual hook-shaped bend.

The automatic handling and installation of tension springs still today presents great problems when these springs are presented randomly in a feeding system or apparatus consisting of a vibratory hopper for further handling. By means of a special configuration of the feeding system or of the guidance paths provided in this feeding system, it is fundamentally possible to align the tension springs such that they will be carried end-on in the direction of movement to the assembly robot, and provision can also be made by special measures for only those tension springs to be fed to the assembly robot which are not entangled with others, but heretofore no apparatus have been known which can assure a reliable orientation of tension springs on their length such that all of the springs fed or forwarded to the assembly robot will have the orientation appropriate for their further processing or further installation also with regard to the position of their hook-shaped bends, even though the assurance is provided during the manufacture of the tension springs that the hook-shaped bends will have a precisely determined position relative to one another.

The invention is addressed to the problem of devising an apparatus by which not only the singling out of tension springs but mainly also their orientation with regard to the position of the hook-shaped bends will be possible in an especially simple and reliable maner.

An apparatus corresponding to the characterizing part of claim 1 is designed for the solution of this problem.

By means of the sword-like element which can be moved into the chamber of the receiver and which presses against the at least one hook-like bend in the tension spring, at a portion of this bend between the actual bend and the coiled portion of the tension spring, the tension spring is turned on its longitudinal axis until it is in the desired orientation. After the orientation, the receiver, which is initially in its first position, i.e., in its rest position, is turned to the second position in which the open end of the receiver is outside of the guide, so that then the end of the tension spring projecting beyond this open end of the chamber in the receiver can be grasped, for example by means of a gripper or tongs of an assembly robot, or by means of some other carrier, and the tension spring can thus be delivered in the oriented position for further use.

The apparatus according to the invention is characterized by a relatively simple but nevertheless very reliably operating construction.

Figure 2:
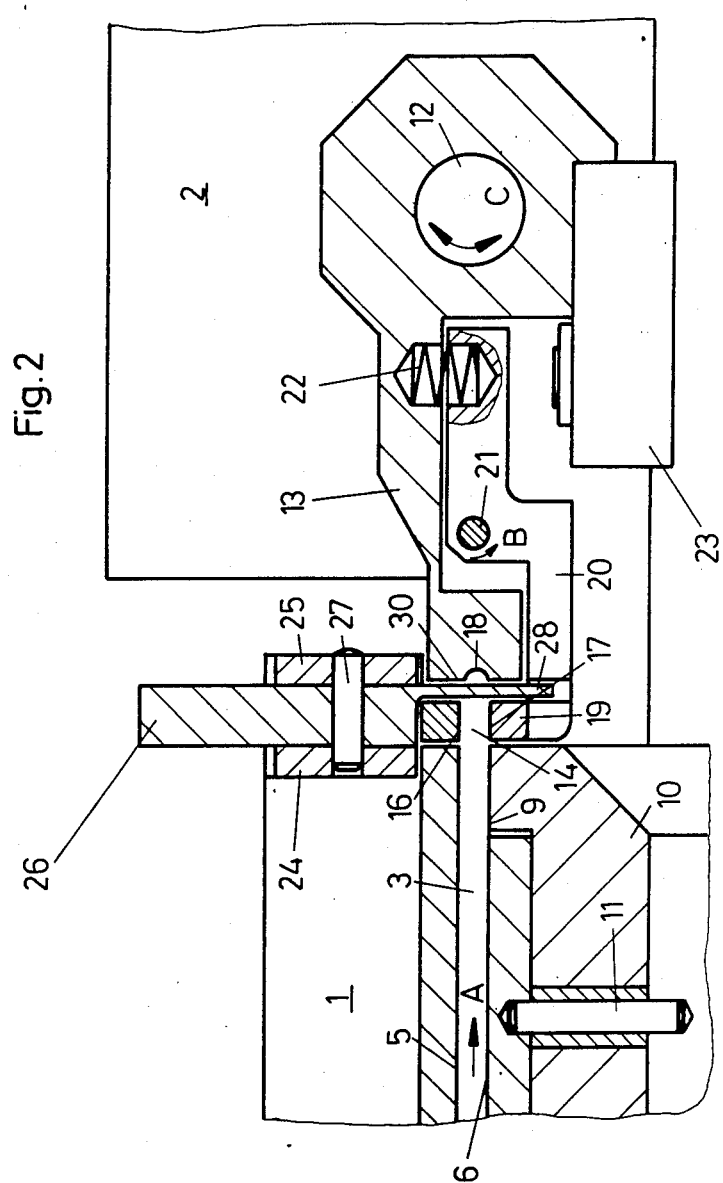
Figure 3:
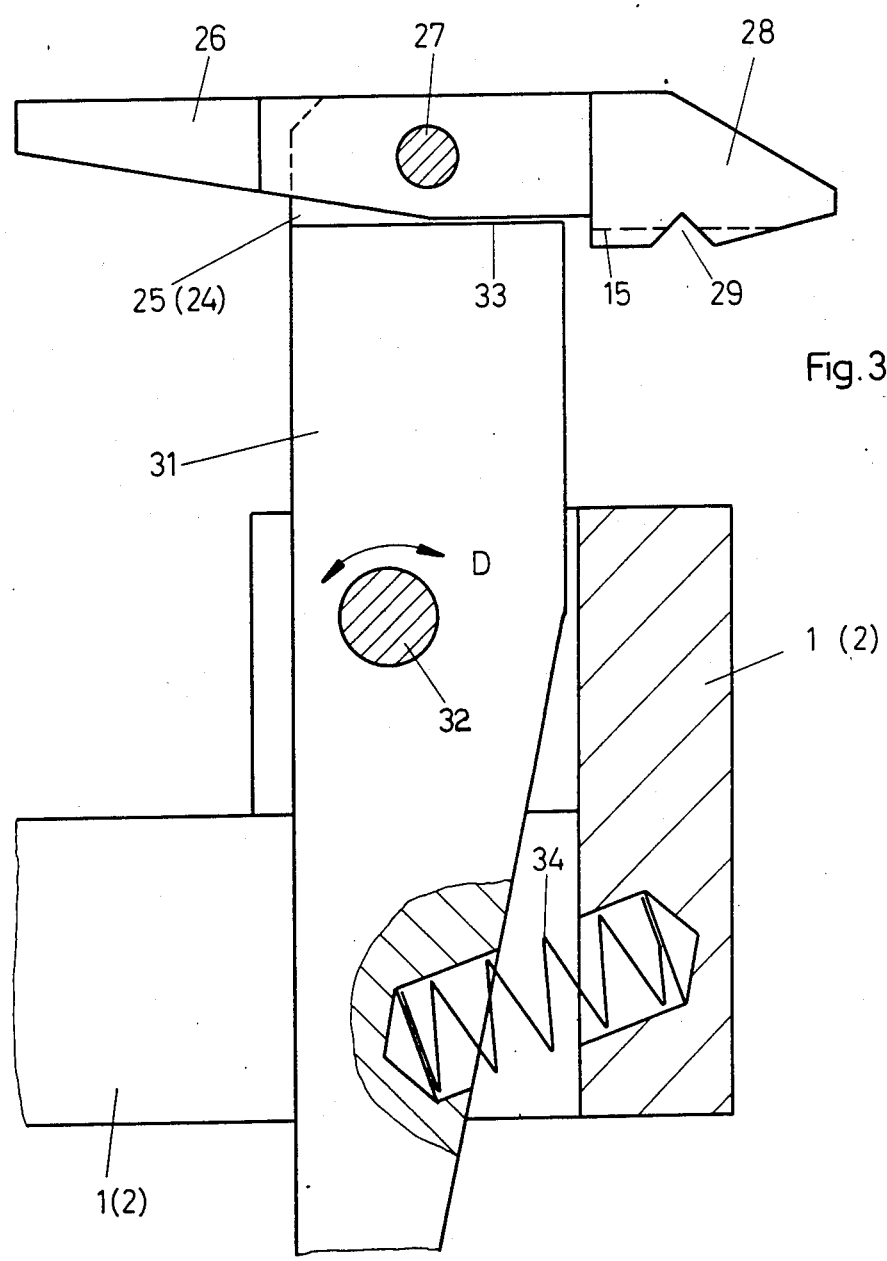

The invention will be further explained below by means of an embodiment in conjunction with the drawings, wherein:

FIG. 1 is a simplified representation, in longitudinal cross section, of an apparatus according to the invention, FIG. 2 is a cross section through the apparatus of FIG. 1, taken along line I—I, FIG. 3 is a detail in plan of the sword-like element of the apparatus according to FIG. 1, together with the parts bearing this element.

In the drawings, 1 and 2 are parts of a stationary guiding frame. On the upper portion of part 1 there is formed a rectilinear guide running substantially in the horizontal direction, in the form of a groove-like guiding channel 3 which is closed on its bottom 4 and its two longitudinal sides 5 and 6 which form continuous guiding surfaces, and it is covered additionally at its top by a cover plate 7. Tension springs 8 are fed through the guiding channel 3 by a feeder which is not shown, in the direction of the arrow A, i.e., in the manner of representation chosen for FIG. 1, from the left to the right; the feeder can be, for example, a vibrating hopper or other such machine. The movement of the tension springs disposed with their length parallel with the length of the guiding channel 3 and end to end in the latter, is produced in this guiding channel by means, for example, of compressed air flowing in the direction of the arrow A through the guiding channel 3.

At the end of the guiding channel 3 that is remote from the feeder delivering the coil springs 8, i.e., in the manner of representation chosen for FIG. 1, at the right end thereof, the longitudinal side, or the lateral guiding or defining surface of this channel situated in a vertical plane, is formed by the surface 9 of an element 10 which is held pivotally on a pivot pin 11 on the fixed guiding part 1 about a horizontal axis running perpendicular to the length (arrow A) of the guiding channel 3.

With the aid of driving means not shown in detail, the element 10 can be swung upwardly or downwardly about the axis of the pin 11 such that the section of element 10 bearing the surface 9 forms with surface 9 the prolongation of the side surface 6 when this element is in the raised position, and when the element 10 is in the lowered position the surface 9 lies below the bottom or floor 3 of the guiding channel, so that, when the element 11 is in the lowered position, a side opening will result in the guiding channel 3 on the longitudinal side 6 at the channel end remote from the system feeding the coil tension springs 8, and, after the tension springs 8 have been oriented with their extremity trailing in the direction of movement, they can be swung laterally out of the guiding channel through this side opening, as will be described in detail further below.

At the end of the guiding channel 3 remote from the feeder for delivering the tension springs 8 a receiver 13 is pivoted on the stationary apparatus part 2 about a horizontal axis (corresponding to the double arrow C) on a pivot pin 12. The pivot pin 12 is arranged so that its axis and the prolongation of the longitudinal axis of the guiding channel 3 intersect and the pivot pin 12 is at a relatively great distance from the end of the receiver 13, i.e., the end of guiding channel 3 remote from the tension spring feeder. On the side facing the guiding channel 3, the receiver 13 is provided with a chamber 14 which is defined on its bottom by a solid bottom surface 15, on each of its two sides by a vertical side surface 16 and 17, respectively, and on its end facing away from the guiding channel 3 by a likewise vertical face 18 whose distance from the open end of chamber 14 facing the guiding channel is less than the length of the tension springs 8.

In the embodiment represented, the side surface 17 of the chamber 14 is formed by one surface of a jaw 19 which is fastened to one end of a two-armed lever 20, which in turn is pivoted on a pivot pin 21 on the receiver 13 about a vertical axis. The other end of the lever 20 is engaged by a compression spring 22 acting between this lever and the receiver 13, which biases lever 20 and thus the jaw 19 to a position wherein the side surface 17 is at a distance from the side surface 16 that is slightly less than the diameter of the tension springs 8. By means of an actuator, such as for example a pneumatically operated actuating cylinder 23, which likewise acts on the end of lever 20 remote from the jaw 19, this lever can be turned on the pivot pin 21, as indicated by arrow B in FIG. 2, against the action of the compression spring 22, to bring the side surface 17 away from the side surface 16.

The figures show the receiver 13 in its rest position wherein the chamber 14 forms the prolongation of the guiding channel 3. By means of a drive system, which is not shown in detail, such as a pneumatically actuated cylinder, for example, the receiver 13 can be pivoted on the pivot pin 12 in the direction of the arrow C such that the open end of the chamber 14 will be shifted to one side of the guiding channel 3, in an area which is freed, upon the depression of element 10, from the part of this element bearing the surface 9. Needless to say, the pivoting of the receiver 13 can also be performed over a larger angular range if this should be necessary for the purpose of transferring the properly oriented tension springs 8.

On the side opposite the element 10, a lever 26 is mounted so as to be freely pivotable on a pivot pin 27. The axis of the pivot pin 27 is parallel to the length or central axis of the guiding channel 3. At its one end the lever 26 is configured as a sword-like element 28 of reduced breadth, which lies with its face sides in vertical planes and transversely of the length of the guiding channel 3, and has on its bottom end a V-shaped notch 29. This notch lies in the area of the central axis and above the central axis of the guiding channel 3.

At the chamber 14, the receiver 13 has a groove-like recess 30 which runs transversely of the length of the chamber 14 and is created not only in the area of the side surface 16 or in the part of receiver 13 that forms this side surface, but extends also into the bottom 15 of the chamber 14, so that, when the sword-like element 28 swings from a position lying above the chamber 14 into the working position, the bottom portion of the sword-like element 28 containing the notch 29 can move into the chamber 14 to such an extent that the closed end of the notch 29 (corresponding to the broken line 15 in FIG. 3) will be at approximately the same level as the bottom surface 15, or at a slight distance above this bottom surface 15, this distance being equal to the wire diameter of the tension springs 8, i.e., the diameter of the spring wire used in making these tension springs.

The two ears 24 and 25 form the upper, forked end of a lever 31 which is pivoted on a pivot pin 32 about an axis parallel to the length of the guiding channel 3 on one of the two apparatus parts 1 and 2, as indicated by the double arrow D in FIG. 3. The lever 31 forms with a surface between the ears 24 and 25 a supporting surface for the bottom of the lever 26 in the area between the pivot pin 27 and the sword-like element 28, so that, whenever the lever 31 swings with its upper end away from the receiver 13, (i.e., in the case of the representation selected for FIG. 3, counterclockwise about the pivot pin 32), the sword-like element 28 is lifted. In the case of the opposite rocking movement of the lever 31, the sword-like element 28 is lowered. By means of a spring or compression spring, not shown, acting between the lever 26 and the lever 31, provision is made for the lever 26 to be biased against lever 31 toward contact with the surface 33. This can also be achieved without using a spring by appropriate weight distribution on lever 26 (including element 28). The rocking of the lever 31 is performed by an actuator which is not shown, such as a pneumatic cylinder, for example. In this case the lever 31 is then preferably biased by a compression spring 34 to its end position and is moved by the pneumatic cylinder against the action of this compression spring to the other pivoted position.

The operation of the apparatus can be described as follows:

The tension springs 8, provided at both ends with hook-like bends 8', are fed through the guiding channel 3 in the direction of the arrow A. The receiver is in its rest position represented in the figures, so that the first tension spring 8 can enter with its leading end into the chamber 14 and come into engagement with its leading hook end 8' against the surface 18. Then, by actuating cylinder 23, the jaw 19 is swung laterally so as to permit unhampered entry of the first tension spring into the chamber 14.

As soon as the first tension spring has come into engagement with surface 18 with its leading hook 8', the initially still raised sword-like element 28 is lowered clockwise by the turning of the lever 31, so that this sword-like element comes with its notch 29 into contact with the leading hook 8' of the tension spring partially contained in the chamber 14, namely the straight portion 8" between the bent end of the hook 8' and the coiled portion of the tension spring 8. On the basis of this contact between the sword-like element 28 and the portion 8" offset laterally from the central axis of the tension spring 8 and the sword-like element 28, the tension spring partially lying in the chamber 14 is rotated about its long axis upon the further lowering of the sword-like element 28 such that the free end of the hook 8 finally points upward, as indicated in FIG. 1. This rotation or orientation of the tension spring 8 is also assisted by the fact that, through the two pivot pins 27 and 32, each of which is disposed laterally of the guide 3 and chamber 14, the sword-like element 28, upon the rotation of the lever 31 after engagement with the tension spring 8 is not only swung downward but simultaneously performs a lateral, horizontal movement transversely of the length of the chamber 14. As soon as the tension spring 8 is oriented in this manner, the jaw 19 is swung against the surface 16, thereby holding the oriented tension spring 8 against rotation in the recess 13. Then the element 10 is lowered or swung downward, so that this element releases the lateral opening in the longitudinal side 6 of the guiding channel 3. Now the receiver 13 is swung about pivot pin 12 in the direction of the arrow C, and thus the end of the aligned tension spring 8 remote from the surface 18 or trailing in the movement in the guiding channel 3 will lie laterally of the guiding channel 3 and can be grasped at its bend 8' by means of a gripper not shown. As soon as the gripper has grasped the aligned spring 8, the pneumatic cylinder 23 is again actuated to release the jaw 19 and the aligned tension spring can then be carried away by the gripper, for example for automatic installation in a workpiece.

The invention has been described above on the basis of an embodiment. It is apparent that changes and modifications are possible without thereby departing from the invention idea that is the basis of the invention.

I claim:

1. Apparatus for the singling and orientation of coiled tension springs which have a hook-like bend at at least one end, said apparatus comprising:
   a guide (3) by which the tension springs lying with their length in the direction of the guidance are delivered from a feeder;
   a receiver (13) provided with a chamber (14), which chamber adjoins the end of the guide (3) that is remote from the feeder for the tension springs (8) and which chamber has an inlet opening for the introduction of the tension spring (8) into the chamber (14) of the receiver;
   means for swinging the receiver (13) about an axis disposed transversely of the direction of the guide (3),
      namely from a first position in which the inlet opening of the chamber (14) is in line with the guide (3) and thereby the chamber (14) of the receiver (13) and forms the prolongation of the guide (3)
      to a second position in which the inlet opening of chamber (14) is out of line with the guide (3);
   a sword-like element at an end of chamber (14) which is remote from the inlet opening of chamber (14); and
   means to move said sword-like element into or out of the chamber in a direction transverse to the chamber.

2. Apparatus according to claim 1, characterized in that means are provided for swinging the receiver (13) about a vertical axis (12) from the first position to the second and vice versa, and that a closable opening is provided on one side of the guide (3).

3. Apparatus according to claim 2, characterized in that the sword-like element is provided on a lever (26, 31) which can pivot about an axis (27, 32).

4. Apparatus according to claim 3, characterized in that the sword-like element (28) is provided on a lever (26) which is mounted on an additional lever (31) by means of a first pivot pin (27), and that the additional lever (31) is fastened pivotally by means of a second pivot pin (32) to a fixed part of the apparatus.

5. Apparatus according to claim 4, characterized in that the axes of the pivot pins (27, 32) are parallel to one another.

6. Apparatus according to claim 5, characterized in that the first pivot pin (27) is disposed at a distance above the second pivot pin (32).

7. Apparatus according to claim 6, characterized in that the lever (26) has a surface disposed for engagement with a surface (33) of the additional lever (31) and that means are provided for biasing said lever surface against said additional lever surface.

8. Apparatus according to claim 7, characterized in that at least one side surface (17) of the chamber (14) on the receiver (13) is formed by a surface of a jaw (19) movable transversely of the length of the chamber (14).

9. Apparatus according to claim 1 characterized in that the sword-like element is provided on a lever (26, 31) which can pivot about an axis (27, 32).

10. Apparatus according to claim 9 characterized in that the sword-like element (28) is provided on a lever (26) which is mounted on an additional lever (31) by means of a first pivot pin (27), and that the additional lever (31) is fastened pivotally by means of a second pivot pin (32) to a fixed part of the apparatus.

11. Apparatus according to claim 10 characterized in that the axes of the pivot pins (27, 32) are parallel to one another.

12. Apparatus according to claim 4 characterized in that the first pivot pin (27) is disposed at a distance above the second pivot pin 32.

13. Apparatus according to claim 10 characterized in that the first pivot pin (27) is disposed at a distance above the second pivot pin (32).

14. Apparatus according to claim 11 characterized in that the first pivot pin (27) is disposed at a distance above the second pivot pin (32).

15. Apparatus according to claim 4 characterized in that the lever (26) has a surface disposed for engagement with a surface (33) of the additional lever (31) and means are provided for biasing said lever surface against said additional lever surface.

16. Apparatus according to claim 5 characterized in that the lever (26) has a surface disposed for engagement with a surface (33) of the additional lever (31) and means are provided for biasing said lever surface against said additional lever surface.

17. Apparatus according to claim 12 characterized in that the lever (26) has a surface disposed for engagement with a surface (33) of the additional lever (31) and means are provided for biasing said lever surface against said additional lever surface.

18. Apparatus according to claim 13 characterized in that the lever (26) has a surface disposed for engagement with a surface (33) of the additional lever (31) and means are provided for biasing said lever surface against said additional lever surface.

19. Apparatus according to claim 10 characterized in that the lever (26) has a surface disposed for engagement with a surface (33) of the additional lever (31) and means are provided for biasing said lever surface against said additional lever surface.

20. Apparatus according to claim 11 characterized in that the lever (26) has a surface disposed for engagement with a surface (33) of the additional lever (31) and means are provided for biasing said lever surface against said additional lever surface.

21. Apparatus according to claim 14 characterized in that the lever (26) has a surface disposed for engagement with a surface (33) of the additional lever (31) and means are provided for biasing said lever surface against said additional lever surface.

22. Apparatus according to claim 1 characterized in that at least one side surface (17) of the chamber (14) on the receiver (13) is formed by a surface of a jaw (19) movable transversely of the length of the chamber (14).

23. Apparatus according to claim 2 characterized in that at least one side surface (17) of the chamber (14) on the receiver (13) is formed by a surface of a jaw (19) movable transversely of the length of the chamber (14).

24. Apparatus according to claim 3 characterized in that at least one side surface (17) of the chamber (14) on the receiver (13) is formed by a surface of a jaw (19) movable transversely of the length of the chamber (14).

25. Apparatus according to claim 4 characterized in that at least one side surface (17) of the chamber (14) on the receiver (13) is formed by a surface of a jaw (19) movable transversely of the length of the chamber (14).

26. Apparatus according to claim 5 characterized in that at least one side surface (17) of the chamber (14) on the receiver (13) is formed by a surface of a jaw (19) movable transversely of the length of the chamber (14).

27. Apparatus according to claim 6 characterized in that at least one side surface (17) of the chamber (14) on the receiver (13) is formed by a surface of a jaw (19) movable transversely of the length of the chamber (14).

28. Apparatus according to claim 9 characterized in that at least one side surface (17) of the chamber (14) on the receiver (13) is formed by a surface of a jaw (19) movable transversely of the length of the chamber (14).

29. Apparatus according to claim 10 characterized in that at least one side surface (17) of the chamber (14) on the receiver (13) is formed by a surface of a jaw (19) movable transversely of the length of the chamber (14).

30. Apparatus according to claim 11 characterized in that at least one side surface (17) of the chamber (14) on the receiver (13) is formed by a surface of a jaw (19) movable transversely of the length of the chamber (14).

31. Apparatus according to claim 12 characterized in that at least one side surface (17) of the chamber (14) on the receiver (13) is formed by a surface of a jaw (19) movable transversely of the length of the chamber (14).

32. Apparatus according to claim 13 characterized in that at least one side surface (17) of the chamber (14) on the receiver (13) is formed by a surface of a jaw (19) movable transversely of the length of the chamber (14).

33. Apparatus according to claim 14 characterized in that at least one side surface (17) of the chamber (14) on the receiver (13) is formed by a surface of a jaw (19) movable transversely of the length of the chamber (14).

34. Apparatus according to claim 15 characterized in that at least one side surface (17) of the chamber (14) on the receiver (13) is formed by a surface of a jaw (19) movable transversely of the length of the chamber (14).

35. Apparatus according to claim 16 characterized in that at least one side surface (17) of the chamber (14) on the receiver (13) is formed by a surface of a jaw (19) movable transversely of the length of the chamber (14).

36. Apparatus according to claim 17 characterized in that at least one side surface (17) of the chamber (14) on the receiver (13) is formed by a surface of a jaw (19) movable transversely of the length of the chamber (14).

37. Apparatus according to claim 18 characterized in that at least one side surface (17) of the chamber (14) on the receiver (13) is formed by a surface of a jaw (19) movable transversely of the length of the chamber (14).

38. Apparatus according to claim 19 characterized in that at least one side surface (17) of the chamber (14) on the receiver (13) is formed by a surface of a jaw (19) movable transversely of the length of the chamber (14).

39. Apparatus according to claim 20 characterized in that at least one side surface (17) of the chamber (14) on the receiver (13) is formed by a surface of a jaw (19) movable transversely of the length of the chamber (14).

40. Apparatus according to claim 21 characterized in that at least one side surface (17) of the chamber (14) on the receiver (13) is formed by a surface of a jaw (19) movable transversely of the length of the chamber (13).

41. Apparatus according to claim 3, characterized in that the pivot axis (27, 32) of said lever (26, 31) is disposed parallel with said guide (3).

42. Apparatus according to claim 9, characterized in that the pivot axis (27, 32) of said lever (26, 31) is parallel with said guide (3).

* * * * *

UNITED STATES PATENT AND TRADEMARK OFFICE
CERTIFICATE OF CORRECTION

PATENT NO. : 4,667,806
DATED : May 26, 1987
INVENTOR(S) : Siegmund Kumeth

It is certified that error appears in the above-identified patent and that said Letters Patent is hereby corrected as shown below:

Column 5, line 6, change "invention" to --inventive--.

Column 8, line 28, change "(13)" to --(14)--.

Signed and Sealed this

Eighth Day of December, 1987

Attest:

DONALD J. QUIGG

Attesting Officer

Commissioner of Patents and Trademarks